March 20, 1951 J. LEVY 2,545,478

TELEPHONE INSTALLATION USING A SINGLE LINE

Filed May 21, 1948 3 Sheets-Sheet 1

Inventor
Jacques Levy
by his attorneys
Christy, Parmelee & Strickland

March 20, 1951 J. LEVY 2,545,478

TELEPHONE INSTALLATION USING A SINGLE LINE

Filed May 21, 1948 3 Sheets-Sheet 2

Inventor
Jacques Levy
by his attorneys
Christy, Parmelee & Strickland

March 20, 1951 J. LEVY 2,545,478

TELEPHONE INSTALLATION USING A SINGLE LINE

Filed May 21, 1948 3 Sheets-Sheet 3

Inventor
Jacques Levy
by his attorneys
Christy, Parmelee & Strickland

Patented Mar. 20, 1951

2,545,478

UNITED STATES PATENT OFFICE 2,545,478

TELEPHONE INSTALLATION USING A SINGLE LINE

Jacques Levy, Paris, France, now by change of name, Jacques Lory

Application May 21, 1948, Serial No. 28,447
In France May 29, 1947

8 Claims. (Cl. 179—1)

In loud speaker telephone installations two systems are commonly used: the first comprises at each station a separate microphone and loud speaker. Two lines are used connecting the stations permanently, a microphone of one station with the loud speaker of the other, each line comprising an amplifier.

In the other system each station comprises only a single apparatus serving part of the time as microphone and part of the time as loud speaker and the installation comprises only a single line connecting the apparatuses this line including a single amplifier. It is necessary in this case to provide a switch-device, heretofore hand-operated, to permit of connecting to the intake and to the output respectively of the amplifier the apparatus of the station which is to speak or transmit and the apparatus of the station which is to listen or receive. In general, this switch is operated by one only of the stations called the "Principal" station.

These two systems possess certain drawbacks. In the two-line system, the acoustic couplings which are produced at the ends of the lines give rise to whistling noises. For the suppression of these noises, it has been proposed to block the line not used but these systems are relatively complicated and do not avoid the untimely blocking or unblocking of the lines by parasitic noises such as frequently exist in industrial places wherein the stations may be situated. Moreover, the power of audition is generally limited.

The system using a single line known as the "inter-phone" requires one at least of the persons conversing to remain in the neighbourhood of the apparatus for operating the switch with the designations "listen-speak." In any case, the operation of this switch is a tedious requirement and is liable to give rise to false operations. It immobilizes one of the hands of a speaker. Finally, when the switch is only mounted at the principal station, the secondary station can take over the speaking only when permitted by the principal station.

The invention has for its object to provide an installation of the "interphone" type which remedies these drawbacks, and consists in controlling the switch, which changes a station from speaking to listening and vice versa, not by a manually operated device but by a device controlled electrically by selected sound waves (voice pronouncing certain syllables, note emitted by a whistle, a siren, etc.).

In one example of carrying out the invention, each station comprises, in addition to the principal apparatus which functions at one time as an emitter and at another time as a receiver, an auxiliary microphone adapted for gathering the aforesaid selected sounds and the current of which, suitably amplified, acts upon a system of relays which determines the desired switching in the single line of transmission.

In the accompanying drawings, there is diagrammatically represented, by way of example, one mode of carrying out the invention.

Figure 1:
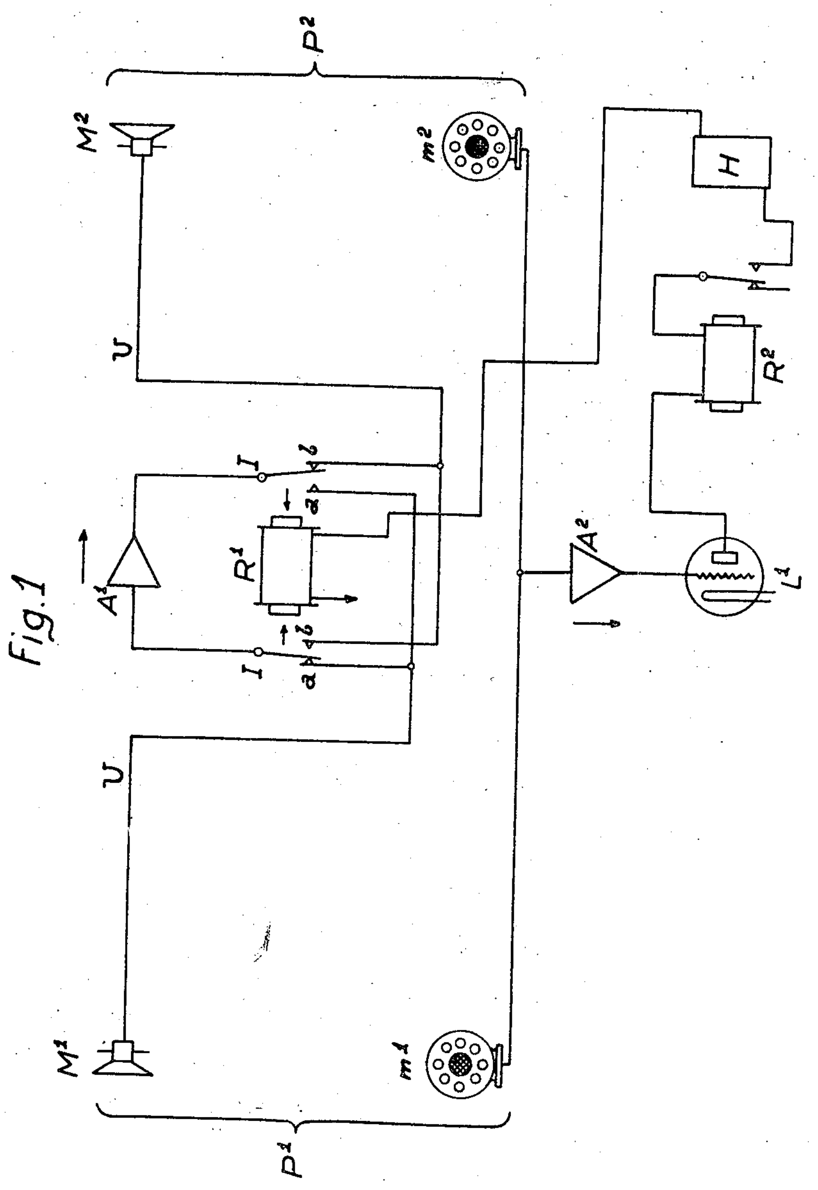
Figure 1 is a diagram illustrating the principle of the invention.

In Figure 1, there are two stations P1, P2, each comprising a principal apparatus M1, M2 (functioning at one time as microphone and at another as loud speaker) and an auxiliary microphone $m'm^2$.

M1, M2 are connected by a single line U—U (here represented for simplicity by a wire). With this line there is combined an amplifier A1. Two switches 1 each comprising two contacts $a$ $b$ permit of connecting the amplifier A1 in the line U—U in such manner that it can be used either in the direction M1 to M2 or in the direction M2 to M1. The operation of the switches 1—1 is effected, according to the present invention, by a relay R1 which, in one of its positions makes the contacts $a$ $a$ active and in the other position makes the contacts $b$ $b$ active. The operation of R1 is controlled by a relay R2 traversed by the anodic current of a valve L1 the grid of which is polarized by an amplifier A2 energized by one or the other of the auxiliary microphones $m'm^2$. In this example of carrying out the invention, the relay R1 is actuated to and fro by a system of relays indicated diagrammatically at H and actuated by R2. Consequently, each time that $m'$ or $m^2$ actuates A2, R1 functions and the conversation between M1 and M2 is reversed.

Figure 2:
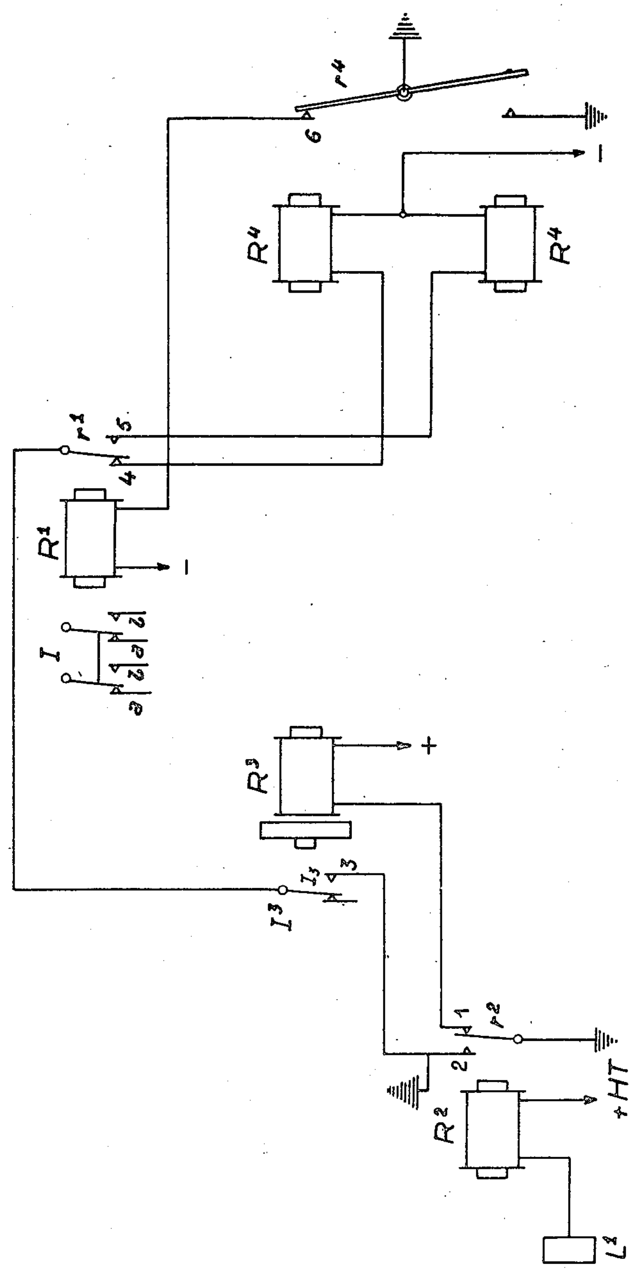
Figure 2 illustrates one suitable assemblage of relays.

In Figure 2, there is represented a suitable scheme for the to and fro system indicated at H in Figure 1. The relay R2 comprises an armature $r^2$ which can make either one of two contacts, working 2 and idle 1. The contact 1 closes the circuit upon the retarded relay R3 the armature $r^3$ of which closes, for working, the contact 3 connecting to the armature $r^1$ of the relay R1. According to whether R1 is energized or deenergized $r^1$ is displaced and makes contact with either 4 or 5. These two contacts are connected to two windings of a relay R4 and these windings are wound oppositely. R4 comprises a swinging armature $r^4$ which comprises a single active contact 6 inserted in the circuit of R1. It is seen, therefore, when current arrives at R4 by way of contact 4 or contact 5 $r^4$ opens or closes the circuit of R1 and as $r^1$ is itself operated by R1, the impulses received by R4 have finally for effect to put R1 alternatively to rest or to work.

The successive impulses of R4 are received from R2 in the following manner:

Normally, R2 is at the working position. When $m^1$ or $m^2$ is actuated there results a positive polarization of L1 which puts R2 to idle. $r^2$ closes through 1 the circuit of R3 which attracts $r^3$ to the contact 3. When the short emission of sounds in $m^1$ or $m^2$ ceases, R2 returns to the working position, R3 remaining at the working position since it is retarded.

The circuit of R4 is then closed by the contacts 2 of $r^2$ and 3 of $r^3$ for an impulse to R4. R3 then opens the contact 3 and R4 ceases to be excited.

The amplifier A2 should be understood to be regulated in such manner that it only permits passage of oscillations corresponding to syllables, words or sounds determined in advanced for producing reversal of the direction of conversation.

For these syllables, words or sounds there would be chosen consonants or characteristic sounds met with only rarely in ordinary conversation or not likely to be emitted with a sufficient intensity in the neighbourhood of the microphones $m^1$ and $m^2$.

If recourse is had to syllables or words, the adjustment of the selective amplifier demands oscillographic study of the chosen word and the establishment of resonant circuits within the envelope of the oscillographic curve. Such apparatus has already been provided for the voice-control of doors or robots and more recently for controlling the repetition or cancelling, from a distance, of telephonic communications recorded on a steel wire by an electro-magnetic process.

It is possible to provide, moreover, a visual and audible control of the working of the electronic inverter by actuating, through the relay R1, a lamp which lights up in the station available for speech at the time that an audible signal is sounded.

Figure 3:
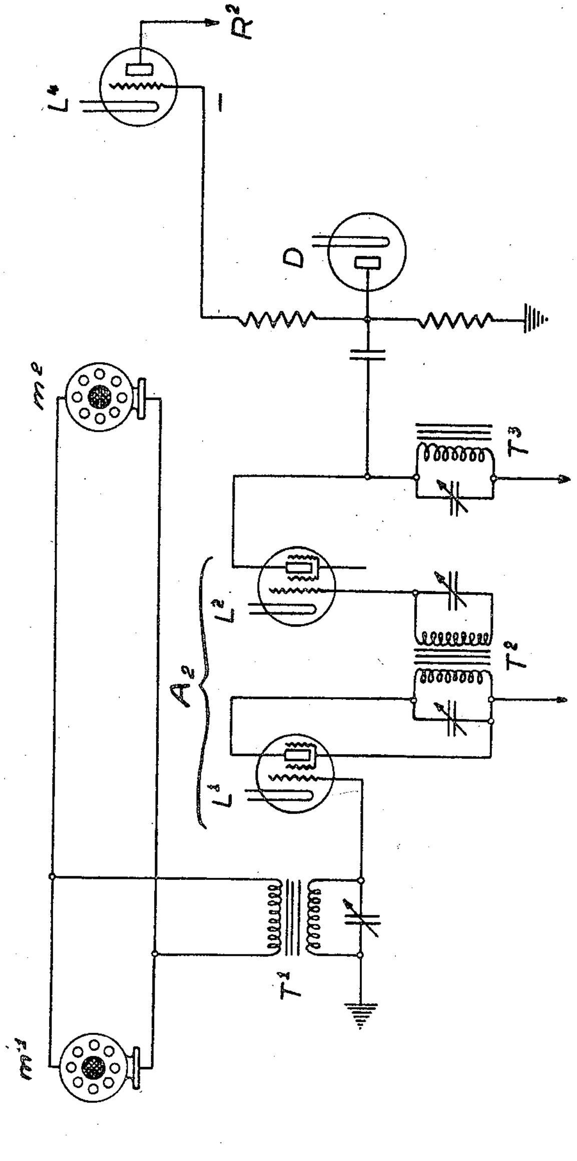
Figure 3 is a variant applicable for the control of the inversion of a sonorous apparatus.

In Figure 3 is illustrated an arrangement of the amplifier A2 in the case where the latter should react to a given sound. The microphones $m^1$ and $m^2$ transmit the sound to a valve L1 through the intermediary of a transformer secondary tuned to the frequency F of the predetermined sound. A transformer T2, also tuned to F is connected to a valve L2 with tuned plate circuit. The frequency F, strongly amplified, comes alone to the rectifier D which then furnishes to the grid of L4 a negative tension, cutting the anodic current of L4. The relay R2 (Figure 2) falls off during the emission of the sound of frequency F to return to the working position when the emission of frequency F ceases before one of the microphones.

The selective amplifier could be realized in any known manner and in particular by circuits of contra-reaction.

The emission of a characteristic sound or word can also be utilized for putting under current the amplifier of conversation.

What I claim is:

1. A loud speaker telephone installation comprising in combination two stations each including an apparatus functioning alternatively as a transmitter and as a receiver, a single line connecting the apparatuses of the two stations, a principal amplifier having terminals for connection in said line, a control relay for reversing the connections of said terminals in said line, and means for operating the relay in response to the emission, in the neighbourhood of either of the stations, of a sound having a predetermined frequency.

2. A loud speaker telephone installation comprising in combination a single line having a transmitter-receiver apparatus and a secondary microphone at each end thereof, a principal amplifier having terminals for connection in said line, a control relay for reversing the connection of said terminals in said line, an amplifier connected with said secondary microphones and operative in response to sounds of a predetermined frequency over said microphones, and means operated by said amplifier for actuating said control relay.

3. A single line loud speaker telephone installation comprising in combination two stations respectively having a transmitter-receiving device, a line connecting said devices, an amplifier having terminals for connection in said line, and a switch for reversing the connections of said terminals in said line, and two secondary microphones, a line connecting said microphones and including a second amplifier, a first relay for operating said reversing switch, a second switch also operated by said first relay, a second relay having an energizing circuit controlled by said second switch and having an armature and a contact operated thereby for controlling the operation of said first relay, a control relay actuated by said second amplifier and having an idle contact and a work contact alternately operated thereby, and a retarded relay having a work contact operated thereby, means whereby operation of the idle contact of the control relay is effective to actuate the retarded relay and means whereby operation of both of the work contacts of the control relay and of the retarded relay is effective to operate said first relay.

4. A single line loud speaker telephone system installation comprising in combination two stations respectively having a transmitter-receiver unit, a single line connecting said units and including an amplifier having terminals for connection in said line, a reversing switch for reversing the connections of said terminals in said line, and frequency responsive means for controlling the operation of said reversing switch comprising a secondary microphone at each of said stations, a control line connecting said secondary microphones, a first transformer operable in response to signals of a predetermined frequency impressed on said control line by said microphones, a two-stage electronic amplifier operated by said transformer and including a coupling transformer tuned to said predetermined frequency, a control relay, a rectifier for rectifying the out-put of said electronic amplifier, an electronic valve controlling the operation of said control relay, a biasing circuit connecting said valve with said rectifier, a first relay for operating said reversing switch, a second switch operated by said first relay, a second relay having an energizing circuit controlled by said second switch and having an armature and a contact operated thereby for controlling the operation of said first relay, the control relay actuated by said electronic valve having an idle contact and a work contact alternately operated thereby, and a retarded relay having a work contact operated thereby, means whereby operation of the idle contact of the control relay is effective to actuate the retarded relay and means whereby operation of both of the work contacts of the control relay and of the retarded relay is effective to operate said first relay.

5. A single line loud speaker telephone system installation comprising in combination two stations respectively having a transmitter-receiver unit, a single line connecting said units and including an amplifier having terminals for connection in said line, a reversing switch for reversing the connections of said terminals in said line, and frequency responsive means for controlling the operation of said reversing switch comprising a secondary microphone at each of said stations, a circuit connected with said microphones and including means for transmitting only signals having a predetermined frequency range, and a relay energized in response to the transmission of signals over said circuit for actuating said reversing switch.

6. In a two-way communication system having a pair of transmitting and receiving stations and a single line connecting said stations, the combination comprising an amplifier for connection in said line, a reversing switch for reversing the connection of said amplifier in said line, said line being operable to conduct signals only in a direction dependent upon the position of said reversing switch, and means responsive to a sound of a predetermined frequency at either of said stations for operating said reversing switch.

7. In a two-way communication system having a pair of transmitting and receiving stations and a single line connecting said stations, the combination comprising an amplifier for connection in said line, a reversing switch for reversing the connection of said amplifier in said line, said line being operable to conduct signals only in a direction dependent upon the position of said reversing switch, a relay for operating said reversing switch, and means responsive to an audio signal of predetermined frequency from either of said stations for operating said relay.

8. In a two-way communication system having a pair of transmitting and receiving stations and a single line connecting said stations, the combination comprising an amplifier in said line and operable to transmit signals over said line in only one direction at any time, means controlling the operation of said amplifier to select the direction in which it will transmit signals, and means responsive to the frequency of sound signals emanating from either of said stations for operating said control means.

JACQUES LEVY.

REFERENCES CITED

The following references are of record in the file of this patent:

UNITED STATES PATENTS

| Number | Name | Date |
|---|---|---|
| 2,018,464 | Nebel | Oct. 22, 1935 |
| 2,162,547 | Campbell | June 13, 1939 |
| 2,214,804 | Augustadt | Sept. 17, 1940 |
| 2,267,622 | Mitchell | Dec. 23, 1941 |
| 2,424,069 | Tschumi | July 15, 1947 |
| 2,462,532 | Morris | Feb. 22, 1949 |
| 2,466,216 | Ekstrad | Apr. 5, 1949 |